United States Patent Office 2,809,988
Patented Oct. 15, 1957

2,809,988

ACETYLENIC NITRILES

Samuel Allen Heininger, Dayton, Ohio, assignor to Monsanto Chemical Company, St. Louis, Mo., a corporation of Delaware No Drawing. Application March 14, 1956,
Serial No. 571,382

11 Claims. (Cl. 260—465.6)

This invention relates to acetylenic nitriles, and more particularly, provides new alkynyloxypropionitriles and a method of making the same.

In accordance with this invention there are provided alkynyloxypropionitriles, wherein the two carbon atoms juxtaposed to the acetylenic carbon atoms of the alkynyl radical are tertiary carbon atoms, free of hydrogen and attached to a substituent selected from the class consisting of hydroxy and oxypropionitrile radicals, each of the remaining two valences of each of the said tertiary carbon atoms being attached to a hydrocarbon radical free of nonbenzenoid unsaturation and containing from one to six carbon atoms, provided that when both valences of a single tertiary carbon atom are attached separately to a single divalent hydrocarbon radical to form a carbocyclic ring, the said divalent hydrocarbon radical is an aliphatic radical containing from four to six carbon atoms and the said carbocyclic ring is selected from five-membered and six-membered cyclo aliphatic rings. By nonbenzenoid unsaturation is here meant carbon-to-carbon, acetylenic or olefinic unsaturation.

The novel alkynyloxypropionitriles of the invention are of the formulae

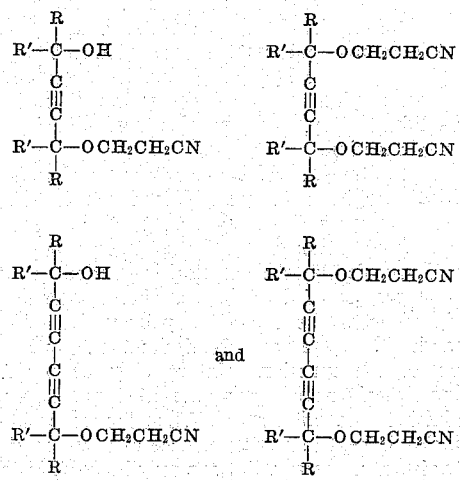

where each R and R' taken separately represent a lower alkyl radical containing from one to six carbon atoms or a phenyl radical, and each R and R' taken together represent, together with the carbon atom to which they are attached, a five- or six-membered cycloaliphatic ring containing from five to seven carbon atoms, i. e., cyclopentyl, cyclohexyl, methylcyclohexyl, ethylcyclopentyl, or dimethylcyclopentyl.

I have made the discovery that compounds of the above formulae may be readily prepared in good yields by the condensation of acrylonitrile with the corresponding tertiary acetylenic diol as illustrated by the following equations:

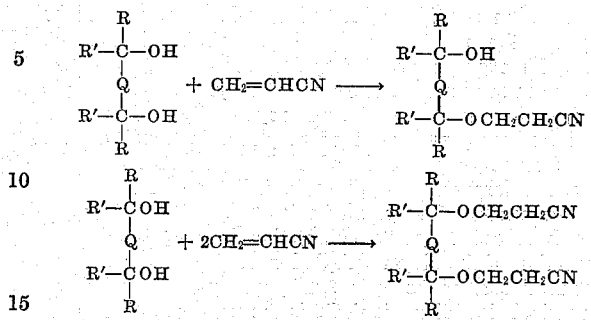

where R and R' are as defined above, and Q represents a divalent radical selected from —C≡C— and —C≡C—C≡C—.

Of particular interest as reactants in carrying out the present process are monoacetylenic diols of the above formula. Monoacetylenic diols are readily available by the addition of two moles of a ketone to one mole of acetylene. Either symmetrical or asymmetrical diols may be reacted with acrylonitrile in accordance with the present process. As examples of monoacetylenic diols of the above formula wherein R and R' are alkyl radicals, may be listed, e. g., 2,5-dimethyl-3-hexyne-2,5-diol, 3,6-dimethyl-4-octyne-3,6-diol, 2,3,6,7-tetramethyl-4-octyne-3,6-diol, 2,2,3,6,7,7-hexamethyl-4-octyne-3,6-diol, 4-ethyl-7-di-n-propyl-5-decyne-4,7-diol, 4,7-di-n-propyl-5-decyne-4,7-diol, 2,4,7,9-tetramethyl-5-decyne-4,7-diol, 2,2,4,7,9,9-hexamethyl-5-decyne-4,7-diol, etc. By condensation of a cycloalkanone with acetylene there are formed diols wherein the two radicals on a single carbon atom, designated R and R' in the above formula, taken together represent the residue of a cyclic radical such as 1,1'-ethynylenedicyclohexanol:

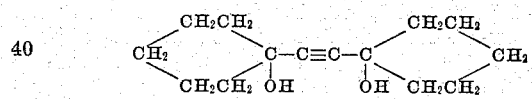

These tertiary acetylenic diols, wherein the carbocyclic rings contain from five to six carbon atoms in the ring and may contain a methyl or ethyl substituent on the cycloaliphatic ring, such as the above-depicted structure, 2,2'-dimethyl-1,1'-ethynylenedicyclohexanol. 1,1'-ethynylenedicyclopentanol, etc., may also be reacted with acrylonitrile in accordance with the present invention. Other presently useful tertiary diols containing a cyclic structure include aryl-substituted tertiary dihydric alcohols such as 2,5 - diphenyl-3-hexyne-2,5-diol, 1,1,4,4-tetraphenyl-2-butyne-1,4-diol, 4,7-diphenyl-5-decyne-4,7-diol, etc.

Also susceptible to the present condensation with acrylonitrile to produce novel acetylenic nitriles are the diacetylenic diols of the formula shown above wherein the radical Q represents a —C≡C—C≡C— group. Diacetylenic diols of the above formula may be readily prepared by coupling monoacetylenic tertiary carbinols, e. g., as described in the copending application of M. Cameron, Serial No. 551,530, filed December 7, 1955. Examples of diacetylenic diols which may be reacted with acrylonitrile in accordance with this invention are, e. g., diacetylenic diols wherein the substituents on the tertiary hydroxy-substituted carbon atoms are alkyl radicals, such as 2,7-dimethyl-3,5-octadiyne-2,7-diol and 3,8-diethyl-4,6-decadiyne-3,8-diol; diacetylenic diols wherein the substituents on the tertiary carbon atoms are phenyl radicals, such as 1,1,6,6-tetraphenyl-2,4-hexadiyne-1,6-diol and 2,7-diphenyl-3,5-octadiyne-2,7-diol; and diacetylenic diols wherein the tertiary carbon atoms juxtaposed to the acetylenic carbon atoms and carrying a hydroxy substituent are members of a cycloaliphatic ring, e. g., 1,1'-(1,3-butadiynylene-1,4)dicyclohexanol and 1,1'-(1,3-butadiynylene-1,4)dicyclopentanol, etc.

The products of the present reaction are hydroxyalkynyloxypropionitriles and alkynylenedioxydipropionitriles. The amount of acrylonitrile added to the diol and the reaction conditions determine which product will be formed, the mono- or the dicyanoethylated product. Thus, for example, by adding acrylonitrile slowly to the diol, so as to introduce one mole of acrylonitrile per mole of diol, there is formed the monocyanoethylated product. By introducing an excess of acrylonitrile equal to two moles or more per mole of diol, the reaction may be caused to form the dioxydipropionitrile; ordinarily, unless a large excess of acrylonitrile is used and/or the reaction is forced to go to completion in the direction of formation of the dicyanoethylation product, I have found that a mixture of the hydroxyalkynyloxypropionitrile and alkynylenedioxydipropionitrile is the usual reaction product.

As exemplary of hydroxyalkynyloxypropionitriles which may be formed in accordance with this invention may be listed, e. g., monoacetylenic products in which R and R' in the above structural formulae are alkyl, such as 3-(2-hydroxy-2,5-dimethyl-3-hexynyl-5-oxy)propionitrile, 3-(3-hydroxy-3,6-dimethyl-4-octynyl-6-oxy)propionitrile, 3-(4-hydroxy-4,7-di-n-propyl-5-decynyl-7-oxy)propionitrile, etc. As examples of the present hydroxyalkynyloxypropionitrile products containing a cycloaliphatic ring may be listed, e. g., 3-(1-[2-(1-hydroxycyclohexyl)ethynyl]cyclohexyloxy)propionitrile, 3-(1-[2-(1-hydroxy-2-methylcyclohexyl)ethynyl]-2-methylcyclohexyloxy)propionitrile, 3-(1-[2-(1-hydroxycyclopentyl)ethynyl]cyclopentyloxy)-propionitrile, etc. Condensation of one mole of one of the presently useful aryl-substituted monoacetylenic diols with one mole of acrylonitrile gives, for example, 3-(2-hydroxy-2,5-diphenyl-3-hexynyl-5-oxy)propionitrile, 3-(1-hydroxy-1,1,4,4-tetraphenyl-3-butynyl-4-oxy)propionitrile, etc.

As exemplary of the present monohydroxy compounds derived from diacetylenic diols may be listed, e. g., 3-(2-hydroxy-2,7-dimethyl-3,5-octadiynyl-7-oxy)propionitrile, 3-(2-hydroxy-2,7-diphenyl-3,5-octadiynyl-7-oxy)propionitrile, 3-(1-[4-(1-hydroxycyclohexyl)-1,3-butadiynyl]-cyclohexyloxy)propionitrile, etc.

By addition of two moles or more of acrylonitrile to the present diols and prolonged reaction, there are formed alkynylenedioxydipropionitriles. When the R and R' radicals in the above-depicted monoacetylenic diols are both alkyl radicals, there are formed, e. g., 3,3'-(2,5-dimethyl-3-hexynylene-2,5-dioxy)dipropionitrile, 3,3'-(3,6-dimethyl-4-octynylene-3,6-dioxy)dipropionitrile, 3,3'-(2,3,6,7-tetramethyl-4-octynylene-3,6-dioxy)dipropionitrile, 3,3'-(4,7-di-n-propyl-5-decynylene-4,7-dioxy)dipropionitrile, etc. From cycloaliphatic diols may be prepared, e. g., 3,3'-(1,1'-ethynylenedicyclohexyloxy)dipropionitrile, 3,3'-(1,1'-ethynylenedicyclopentyloxy)dipropionitrile, 3,3'-(2,2'-dimethyl-1,1'-ethynylenedicyclohexyloxy)-dipropiontrile, etc. The present novel acetylenic nitriles wherein there are present phenyl radicals include, e. g., 3,3'-(2,5-diphenyl-3-hexynylene-2,5-dioxy)dipropionitrile, 3,3'-(1,1,4,4-tetraphenyl-2-butynylene-1,4-dioxy)dipropionitrile, etc.

By reaction of diacetylenic diols with two moles or excess of acrylonitrile there are formed alkynylenedioxydipropionitriles, e. g., those in which R and R' in the above formulae are alkyl, such as 3,3'-(2,7-dimethyl-3,5-octadiynylene-2,7-dioxy)dipropiontrile, 3,3'-(3,8-diethyl-4,6-decadiynylene-3,8-dioxy)dipropionitrile, and 3,3'-(4,9-dimethyl-5,7-dodecadiynylene-4,9-dioxy)dipropionitrile, etc. The dioxydipropionitriles formed in accordance with this invention from diacetylenic glycols containing cycloaliphatic rings include, e. g., 3,3'-(1,1'-[1,3-butadiynylene-1,4]dicyclohexyloxy)dipropiontrile, 3,3'-(1,1'-[1,3-butadiynylene-1,4]-2,2'-dimethyldicyclohexyloxy)dipropionitrile, 3,3'-(1,1'-[1,3-butadiynylene-1,4]-dicyclopentyloxy)-dipropionitrile, etc. Representative of the aryl-substituted diacetylenic dioxydipropionitriles which may be prepared in accordance with this invention are 3,3'-(1,1,6,6-tetraphenyl-2,4-hexadiynylene-1,6-dioxy)dipropionitrile, 3,3'-(2,7-diphenyl-3,5-octadiynylene-2,7-dioxy)dipropionitrile, 3,3'-(3,8-diphenyl-4,6-decadiynylene-3,8-dioxy)dipropionitrile, etc.

It will be appreciated by those skilled in the art that the present novel compounds may contain asymmetric carbon atoms (the aforesaid tertiary carbon atoms) and are thus susceptible of existing as various optical isomers. Furthermore, by virtue of the rigid triple bonds in these compounds, they may possess geometrical isomerism. All the stereoisomeric forms of the new acetylenic nitriles of this invention are contemplated as coming within the scope of the present invention.

In carrying out the synthesis of the present novel oxypropionitriles, acrylonitrile is simply contacted with the chosen diol until formation of either the monocyanoethylation or the dicyanoethylation product has occurred, depending on the desired course of reaction. In accordance with the stoichiometry of the equations shown above for these reactions, acrylonitrile should be present in from one to two times the molar equivalent of the amount of diol used. Preferably, somewhat excess acrylonitrile is used, to serve as a reaction diluent and to produce more complete reaction of the diol, particularly when formation of the dioxydipropionitrile is desired. The reaction may be carried out in the presence or absence of an inert solvent or diluent; examples of presently useful solvents are, e. g., halogen compounds such as carbon tetrachloride, chloroform or ethylene dichloride; nitrogen compounds such as acetonitrile, dimethyl formamide, etc.; oxygen compounds free of active hydrogen such as ethyl ether or dioxane; and hydrocarbons such as benzene or hexane, etc.

Advantageously, a catalyst is used to accelerate the reaction. In the present addition of acrylonitrile to an alcohol compound, I prefer to use alkaline catalysts. Exemplary of presently useful alkaline catalysts are inorganic bases such as sodium hydroxide, potassium bicarbonate, etc., and organic bases such as pyridine or triethylamine; quaternary ammonium salts such as choline or Triton B, a commercial quaternary reputed to be a benzyl trimethyl ammonium hydroxide; sodium alkoxides such as sodium methylate, etc. Alkali metals such as sodium, sodium-lithium alloy, etc. are also useful catalysts for the present reaction.

The temperature at which the process is carried out is not critical. It must, however, be sufficient for the reaction to take place and be below that at which any substantial decomposition of the reactants or product takes place. Conveniently, the reaction is carried out at the reflux temperature of the mixture, whereby the temperature of boiling of the solvent may be varied to govern the reaction temperature. If desired, the reflux temperature of the reaction mixture may be varied, by changing the solvent or varying the pressure, to accelerate or diminish the reaction rate. When the temperature of the reaction is kept low, the presence of a polymerization inhibitor is not necessary, but one may be used, if desired. It is advisable to use such inhibitors when the temperature of the reaction is allowed to rise rapidly as when, for example, it is desired to accelerate and complete the reaction in a short time. Useful inhibitors include trinitrotoluene, selenium dioxide, hydroquinone, hydroquinone monomethyl ether, methylene blue, copper, copper carbonate, p-hydroxydiphenylamine, etc. The time required for the reaction varies, depending on the diol employed and on the desired product.

The process may be carried out batchwise, intermittently, or continuously, continuous operation being most advantageous for large-scale manufacture. It is desirable in many cases to provide means for agitating the contents in the reaction vessel by shaking, stirring, agitating with an inert gas, etc. It may be desirable to fit the reaction vessel with a condenser or suitable reflux equipment to avoid loss of material where low-boiling reactants are used.

A number of different methods of working up the reaction product for recovery of the oxypropionitrile product are available. Thus, the product may be isolated and purified by distillation, extraction, fractionation or any other suitable process. Preferably, the reaction mixture is cooled and the alkaline catalyst neutralized before the oxypropionitrile compound is recovered. If desired, incompletely cyanoethylated diol may be returned to the reaction, in a cyclic process.

The present novel compounds are generally liquids with a wide range of liquidity and with a high dielectric constant. They are useful for a variety of chemical and agricultural purposes. As chemical intermediates, they possess several reactive positions and can be converted to other useful chemicals, for example, by reaction of the triple bond, by reduction or oxidation of the reactive cyano group, and in the case of the monocyanoethylated acetylenic diol, by reaction of the free hydroxy group. The nitrile radical may, for example, be converted to a carboxyl radical which may be esterified to form esters useful, e. g., as plasticizers and functional fluids. The present nitriles are of particular utility as dielectrics, for example, as transformer oils or capacitor impregnants. They may also, optionally with prior reduction of the acetylenic bond to an olefinic or saturated C—C bond, be used as functional fluids, e. g., for the transfer of heat in cooling mechanisms, for the transmission of force in fluid drives in automobiles and in aircraft hydraulic systems, etc. The compounds of the invention possess hypnotic and analgesic properties. In agricultural applications, the present acetylenic nitriles, including the preferred embodiment of this invention comprising monoacetylenic dioxydipropionitriles wherein each R in the above formulae represents a lower alkyl radical, may be used as fungicides, herbicides, bactericides, nematocides, insecticides, etc. Thus, for example, the compounds wherein all of the R and R' radicals in the above formulae are phenyl groups may be applied to the soil for the suppression of the soil nematode population. The diacetylenic products of the invention may be used to control the growth of fungi. The present oxypropionitriles containing a free hydroxy group may be utilized to kill unwanted vegetation.

The invention is illustrated but not limited by the following examples:

Example 1

This example describes the addition of acrylonitrile to a monoacetylenic diol wherein the tertiary carbon atom carries alkyl substituents.

To a solution of 28.4 g. (0.2 mole) of 2,5-dimethyl-3-hexyne-2,5-diol in 50 g. of ether was added 0.6 g. of sodium. The mixture was stirred at reflux for 30 minutes, and then 21.2 g. (0.4 mole) of acrylonitrile was added dropwise over a period of 20 minutes. To accelerate the reaction, there was then added 0.5 ml. of Triton B. After about one-half hour the reaction became exothermic, and within an hour, the temperature fell off again to room temperature. The mixture was stirred overnight and then filtered, neutralized with hydrochloric acid, and fractionated. After removal of the solvent, there were obtained 9.5 g. of a fraction boiling at 119–121° C./0.3 mm. (fraction I), $n_D^{25}$ 1.4543; and 24.1 g. of a fraction boiling at 149–152° C./0.3 mm., $n_D^{25}$ 1.4536 (fraction II). The material designated as fraction I represented the monocyanoethylated product, the analysis of which corroborated its identification as 3-(2-hydroxy-2,5-dimethyl-3-hexynyl-5-oxy)-propionitrile, while the second fraction was substantially pure 3,3'-(2,5-dimethyl-3-hexy-nylene-2,5-dioxy)dipropionitrile, as shown by the following analysis:

| | Found | Calcd. for $C_{14}H_{20}O_2N_2$ |
|---|---|---|
| Percent C | 67.90 | 67.8 |
| Percent H | 8.19 | 8.11 |
| Percent N | 11.24 | 11.28 |

Example 2

This example describes another preparation of 3,3'-(2,5-dimethyl-3-hexynylene-2,5-dioxy)dipropionitrile.

A mixture was prepared containing 284 g. (2.0 moles) of 2,5-dimethyl-3-hexyne-2,5-diol, 300 ml. of dioxane, and 15 ml. of choline. The mixture was heated to 35° C., and another 5 ml. of 50% aqueous choline was added. There was then added to the reaction mixture 265 g. (5.0 moles) of acrylonitrile, over a period of 2 hours, the temperature of the reaction mixture being held at between 35 and 50° C. After all the acrylonitrile had been added, the mixture was heated with stirring to 105° C. for one-half hour, then cooled to about room temperature and the catalyst neutralized with concentrated sulfuric acid. The reaction mixture was distilled under vacuum to remove solvent and unreacted acrylonitrile, and the remaining material was then filtered through an absorbent filter aid. On distillation, there were obtained 191 g. of 3 - (2 - hydroxy - 2,5 - dimethyl - 3 - hexynyl - 5 - oxy)-propionitrile and 186 g. of 3,3'-(2,5-dimethyl-3-hexynylene-2,5-dioxy)dipropionitrile.

Example 3

By a procedure as described in the above examples, 25.5 g. (0.15 mole) of 3,6-dimethyl-4-octyne-3,6-diol was reacted, in 50 ml. of ether in the presence of 0.4 g. of sodium, with 15.9 g. (0.3 mole) acrylonitrile, with the addition of a catalytic amount of Triton B. On distillation, there were obtained 6.6 g. of 3-(3-hydroxy-3,6-dimethyl-4-octynyl-6-oxy)propionitrile, B. 124–130°/0.5 mm. $n_D^{25}$ 1.4570. Redistillation of the higher-boiling fraction of the reaction mixture yielded 16.7 g. of 3,3'-(3,6-dimethyl-4-octynylene-3,6-dioxy)dipropionitrile, yellow liquid, B. 161–2° C./0.5 mm., $n_D^{25}$ 1.4579, analyzing as follows:

| | Found | Calcd. for $C_{16}H_{24}O_2N_2$ |
|---|---|---|
| Percent C | 69.27 | 69.5 |
| Percent H | 8.61 | 8.75 |
| Percent N | 10.17 | 10.12 |

Example 4

Similarly, by the reaction of 1,1'-ethynylenedicyclohexanol with excess acrylonitrile in the presence of a basic catalyst, there is obtained a mixture of 3 - (1 - [2 - (1 - hydroxycyclohexyl) - ethynyl]cyclohexyloxy)propionitrile and 3,3'-(1,1'-ethynylenedicyclohexyloxy)dipropionitrile.

Example 5

By a procedure as described in the above examples, 1,1'-(1,3-butadiynylene-1,4-)dicyclohexanol is reacted, in the presence of a basic catalyst, with two equivalents of acrylonitrile, to give a mixture of 3-(1-[4-(1-hydroxycyclohexyl) - 1,3 - butadiynyl] - cyclohexyloxy)propionitrile and 3,3'-(1,1'-[1,3-butadiynylene]dicyclohexyloxy)-dipropionitrile.

In utilizing the present acetylenic oxypropionitriles as liquid dielectric compositions, they are advantageously employed as transformer coolants and as liquid impregnants in capacitor and cable manufacture. For example, porous cellulosic insulating materials such as wood pulp paper are impregnated with the present nitriles to form insulating agents suitable for the isolation of a pair of electrodes, the combination of electrodes and insulating agent comprising a capacitor. Thus, e. g., capacitor tissue paper is impregnated with the 3,3'-(2,5-dimethyl-3-hexynylene-2,5-dioxy)dipropionitrile of Example 1. Alternating layers of the impregnated paper and aluminum foil are interleaved, and the stack of alternating paper and metal layers is wound into a cylindrical roll and housed in a paper tube. At this point, wire conductors may be connected to the metal foil in known manner, and the tubular container is then sealed, with the wire conductors protruding, to form an electrical assembly useful as a capacitor.

While the invention has been described with particular reference to various preferred embodiments thereof, it will be appreciated that numerous modifications and variations are possible without departure from the invention.

What is claimed is:

1. Alkynyloxypropionitriles selected from the class consisting of compounds of the formulae

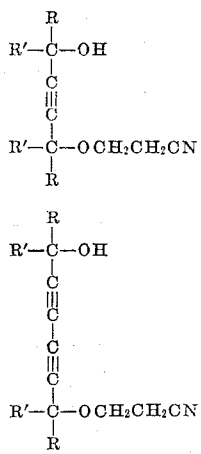 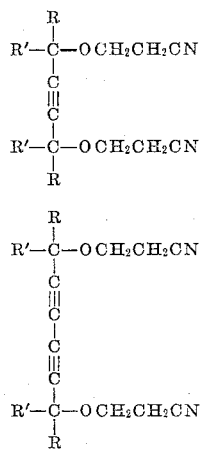

and

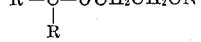 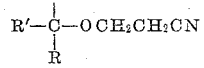

where each R and R' taken separately represents a hydrocarbon radical free of non-benzenoid unsaturation and containing from 1 to 6 carbon atoms and each R and R' taken together represent, together with the carbon atom to which they are attached, a 5- to 6-membered cycloaliphatic ring containing from 5 to 7 carbon atoms.

2. Alkynyloxypropionitriles of the formula

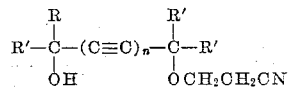

where each R and R' represents a hydrocarbon radical free of non-benzenoid unsaturation and containing from 1 to 6 carbon atoms, and $n$ is an integer of from 1 to 2.

3. Alkynyloxypropionitriles of the formula

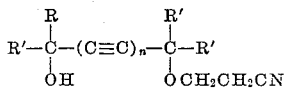

where each R and R' represents an alkyl radical containing from 1 to 6 carbon atoms and $n$ is an integer of from 1 to 2.

4. Alkynyloxypropionitriles of the formula

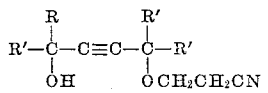

where each R and R' represents an alkyl radical containing from 1 to 6 carbon atoms.

5. Alkynyloxypropionitriles of the formula

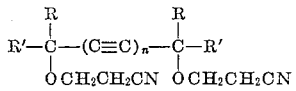

where each R and R' represents a hydrocarbon radical free of non-benzenoid unsaturation and containing from 1 to 6 carbon atoms, and $n$ is an integer of from 1 to 2.

6. Alkynyloxypropionitriles of the formula

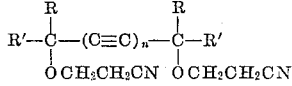

where each R and R' represents an alkyl radical of from 1 to 6 carbon atoms, and $n$ is an integer of from 1 to 2.

7. Alkynyloxypropionitriles of the formula

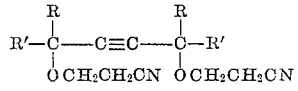

where each R and R' represents an alkyl radical of from 1 to 6 carbon atoms.

8. 3,3'-(2,5-dimethyl-3-hexynylene-2,5-dioxy)dipropionitrile.

9. 3,3'-(3,6-dimethyl-4-octynylene-3,6-dioxy)dipropionitrile.

10. 3-(2-hydroxy-2,5-dimethyl-3-hexynyl-5-oxy)propionitrile.

11. 3-(3-hydroxy-3,6-dimethyl-4-octynyl-6-oxy)propionitrile.

References Cited in the file of this patent

UNITED STATES PATENTS

| | | |
|---|---|---|
| 2,437,905 | Bruson | Mar. 16, 1948 |
| 2,579,580 | Howk et al. | Dec. 25, 1951 |
| 2,669,558 | Mowry et al. | Feb. 16, 1954 |